United States Patent

Nanbu

[11] Patent Number: 5,280,959
[45] Date of Patent: Jan. 25, 1994

[54] SHOULDER ADJUSTER
[75] Inventor: Yuichi Nanbu, Shiga, Japan
[73] Assignee: Takata Corporation, Tokyo, Japan
[21] Appl. No.: 844,161
[22] Filed: Mar. 2, 1992
[30] Foreign Application Priority Data Mar. 8, 1991 [JP] Japan .................................. 3-43438

[51] Int. Cl.5 .............................................. B60R 22/20
[52] U.S. Cl. ................................. 280/808; 280/801 R; 280/802; 280/801 A; 297/468; 297/483
[58] Field of Search ............... 280/801, 804, 805, 802, 280/807, 808, 801 A; 244/122 B; 297/464, 468, 469, 473, 483

[56] References Cited

U.S. PATENT DOCUMENTS

| | | | |
|---|---|---|---|
| Re. 32,448 | 6/1987 | Anderson | 280/801 A |
| 4,469,352 | 9/1984 | Korner | 280/801 A |
| 4,652,012 | 3/1987 | Biller | 280/801 A |
| 4,982,981 | 1/1991 | Fourkey | 280/801 A |
| 5,044,666 | 9/1991 | Griesemer | 280/801 A |

Primary Examiner—Robert J. Oberleitner
Assistant Examiner—Clifford T. Bartz
Attorney, Agent, or Firm—Kanesaka and Takeuchi

[57] ABSTRACT

A shoulder adjuster which comprises: a guide rail shaped into a long plate and formed with a longitudinally extending slot at its central portion; a slider arranged along the vehicular compartment side of the guide rail and made slidable in a longitudinal direction of the guide rail; a female thread formed in the slider for mounting a shoulder anchor; and devices for retaining the slider on the guide rail at a predetermined interval. The slider has a cylindrical portion to be fitted in the slot, and the female thread formed in the inner circumference of the cylindrical portion.

7 Claims, 9 Drawing Sheets

SHOULDER ADJUSTER

BACKGROUND OF THE INVENTION

1. Field of the Invention

The present invention relates to a shoulder adjuster and, more particularly, to a shoulder adjuster of the type to be attached to the center pillar of an automobile for adjusting the height or level of a belt anchor for anchoring a seat belt.

2. Related Art

An ordinary automobile is equipped with a seat belt for protecting a passenger in an emergency such as collision by restricting him on the seat.

In case the passenger's body is to be restricted by the seat belt, the portion of the body is required to have a high strength so that it can stand a load which would grow several ten times as high as the weight of the body. Therefore, a wrap belt is desired to wrap the hipbone without fail, and a shoulder belt is desirably positioned between the shoulder joint and the neck.

The passenger or an object to be restricted has a large difference in individual sizes from kids to adults, and the adjustment of seat position of the passenger is also different for the individuals. In order to cope with these differences, a shoulder adjuster to be used for adjusting the height of the belt anchor of the shoulder belt can have its slider attached to a guide rail and retained on the guide rail at a predetermined pitch and its belt-anchor attached to the slider. Incidentally, there is known in the art a guide rail which is shaped into a long plate so as to maximize the compartment space of an automobile.

In the prior shoulder adjuster, as described above, the slider is equipped with a cylindrical member protruded into the compartment so that it may have the belt anchor attached thereto, and this cylindrical member has its inner circumference internally threaded to receive a belt for mounting the belt anchor.

If the cylindrical member is thus protruded from the slider into the compartment, the belt anchor accordingly projects into the compartment to narrow the compartment space.

OBJECTS AND SUMMARY OF THE INVENTION

An object of the present invention is to provide a shoulder adjuster which is enabled to widen the compartment space of an automobile by minimizing the projection of a belt anchor into a vehicular compartment.

Another object of the present invention is to provide a shoulder adjuster capable of moving up and down a slider smoothly and simply.

According to a first feature of the present invention, there is provided a shoulder adjuster which comprises: a guide rail shaped into a long plate and formed with a longitudinally extending slot at its central portion; a slider arranged along the vehicular compartment side of the guide rail and made slidable in a longitudinal direction of the guide rail; a female thread formed in the slider for mounting a shoulder anchor; retaining means for retaining the slider on the guide rail at a predetermined interval, wherein the slider has a cylindrical portion to be fitted in the slot, and wherein the female thread is formed in the inner circumference of the cylindrical portion.

According to a second feature of the present invention, the slider includes: a plate portion facing the face of the guide rail at the vehicular compartment side; and holding portions formed at the two sides of the plate portion extending around the sides of the guide rail permitting sliding along the sides.

According to a third feature of the present invention, the retaining means includes: hook portions formed in the guide rail; a lock plate arranged at the opposed side of the guide rail to the vehicular compartment side and supported by the slider at one longitudinal side of the guide rail such that its longitudinal other side is made movable toward and apart from the slider; retaining portions formed at the lock plate and adapted to engage with the hook portions to block the sliding movement of the slider when the other side of the lock plate is brought to approach the slider; and a spring supported by the slider and connected to the other side of the lock plate for urging the other side toward the slider.

In the shoulder adjuster of the first feature, the belt anchor can be positioned at a desired height by moving the slider along the guide rail and by retaining the same on the guide rail at the desired height by the retaining means.

In this shoulder adjuster, the cylindrical portion of the slider arranged at the compartment side of the guide rail is fitted in the slot of the guide rail. In other words, the cylindrical portion is arranged at the side opposed to the compartment with respect to the slider. As a result, the belt anchor can be arranged closer to the guide rail than that of the prior art.

In the shoulder adjuster of the second feature, the holding portions hold the guide rail to guide the slider. As a result, the slider can smoothly slide.

In the shoulder adjuster of the third feature, the engagement between the hook portions and the retaining portions can be released to move the slider smoothly and lightly along the guide rail if the lock plate is pushed and retracted apart from the slider. If this pushing force is released, the hook portions and the retaining portions come into engagement to lock the slider.

DESCRIPTION OF THE PREFERRED EMBODIMENT

Figure 1:
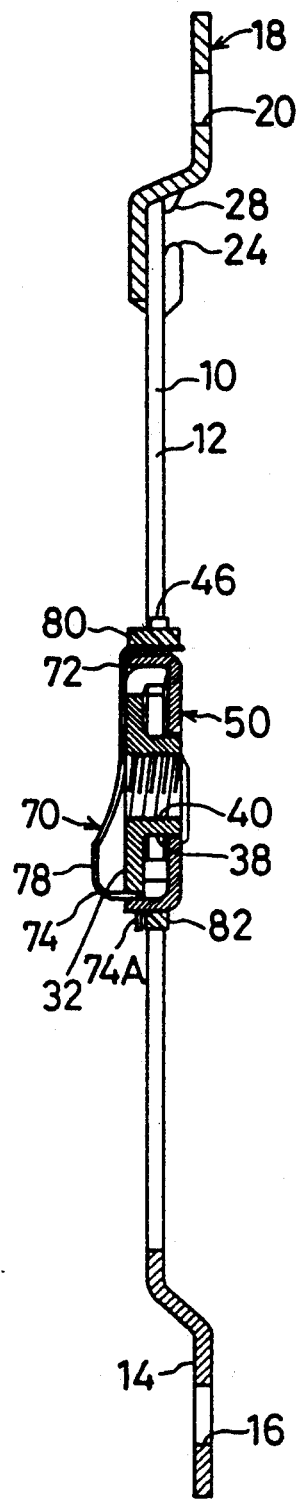
FIG. 1 is a longitudinal section showing a shoulder adjuster according to an embodiment of the present invention.
Figure 2:
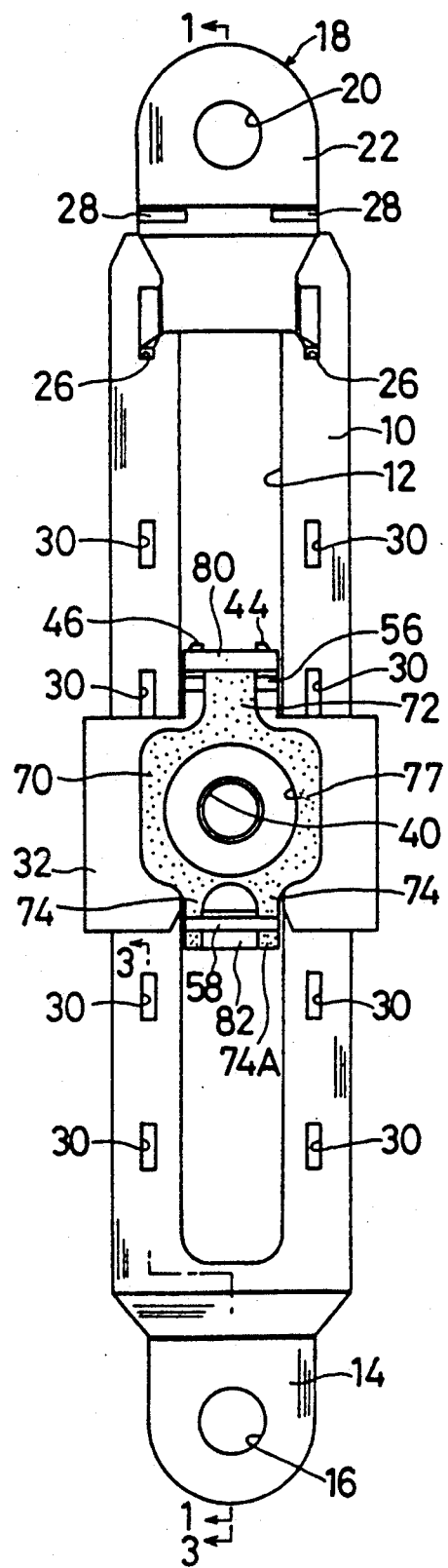
FIG. 2 is a front elevation showing the shoulder adjuster according to the embodiment of the present invention.
Figure 3:
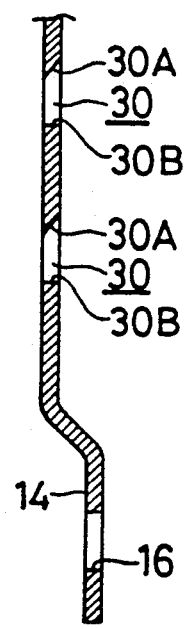
FIG. 3 is a section taken along line 3—3 of FIG. 2.
Figure 4:
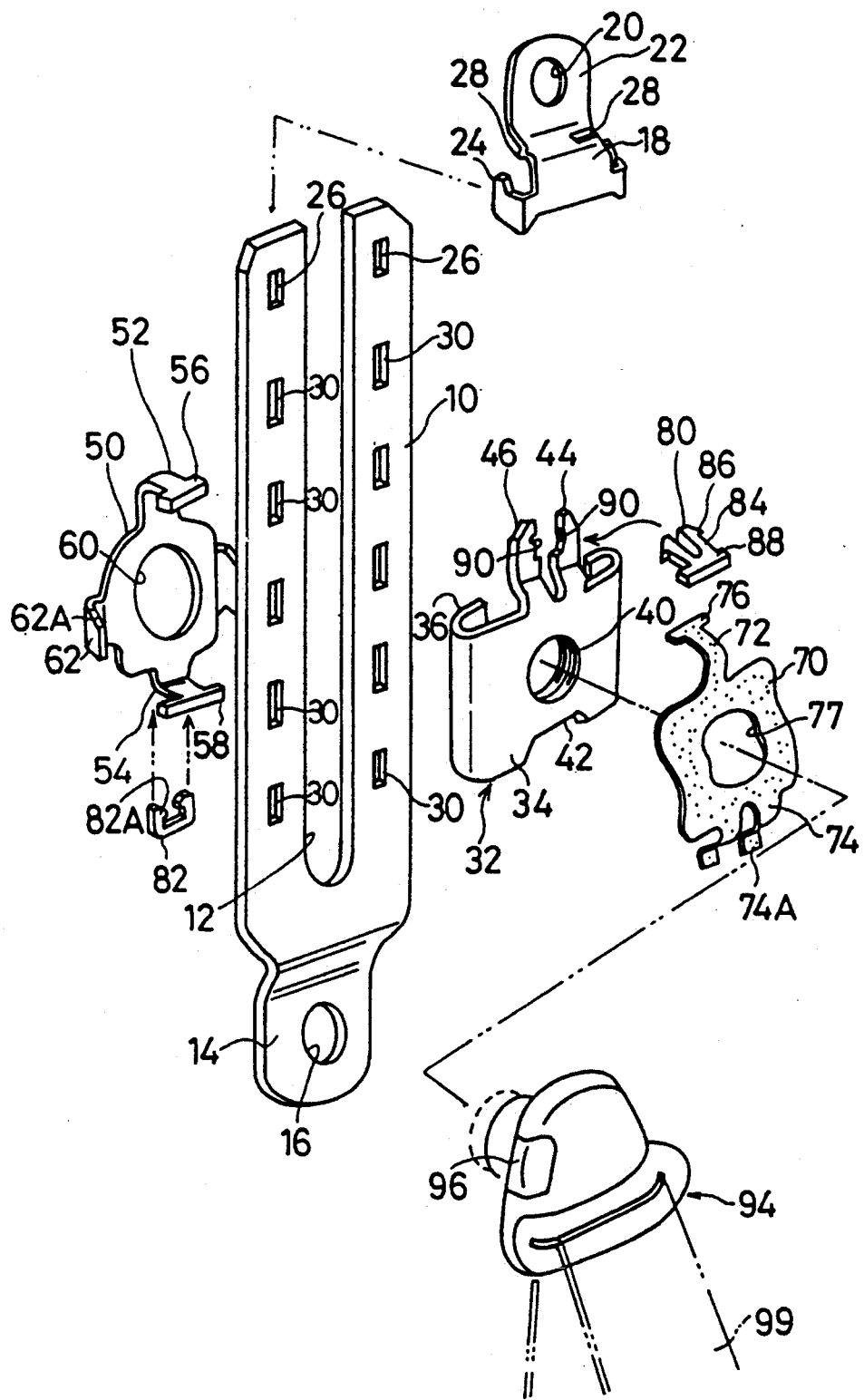
FIG. 4 is an exploded perspective view showing the shoulder adjuster according to the embodiment of the present invention.
Figure 5:
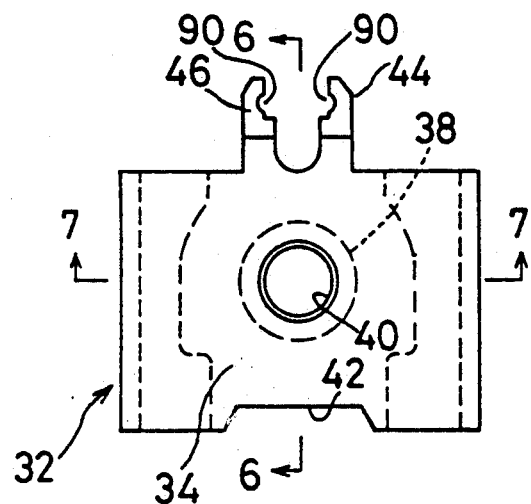
FIG. 5 is a front elevation showing a slider.

With reference to FIGS. 1 to 4 and especially to FIG. 4, a guide rail 10 to be used in the present embodiment is formed into a long U-shape to have a slot 12 extended downward from its upper end. Reference numeral 14 designates a mounting portion for mounting the lower portion of the guide rail 10 to the center pillar of a vehicle, and this mounting portion 14 is formed with a bolt hole 16. To an upper portion of the guide rail 10, there is attached a bracket 18. This bracket 18 is formed with a mounting portion 22 having a bolt hole 20 to be attached to the vehicular center pillar and further with a pair of hooks 24 at its sides. These hooks 24 are fitted in bracket mounting holes 26 which are formed in an upper portion of the guide rail 10. On the other hand, the bracket 18 is formed with protrusions 28 which engage with the upper end of the guide rail 10, as shown in FIG. 1, so that the bracket 18 is fixedly attached to the guide rail 10 by clamping the upper end of the guide rail 10 between the hooks 24 and the protrusions 28.

The guide rail 10 is formed at a predetermined pitch with a plurality of holes 30 acting as hooking portions so that it can retain a later-described slider 32 at a desired height. As shown in FIG. 3, these holes 30 have their inner faces sloped, as indicated at 30A, at their upper portions and normally intersecting the front face of the guide rail 10, as indicated at 30B, at their lower portions.

Figure 6:
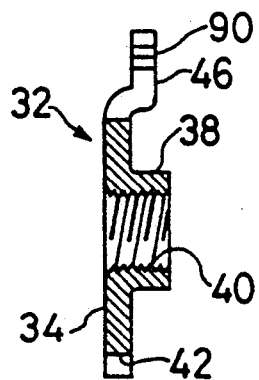
FIG. 6 is a section taken along line 6—6 of FIG. 5.
Figure 7:
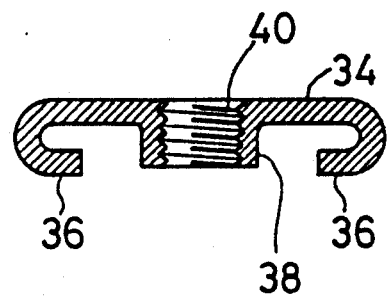
FIG. 7 is a section taken along line 7—7 of FIG. 5.
Figure 8:
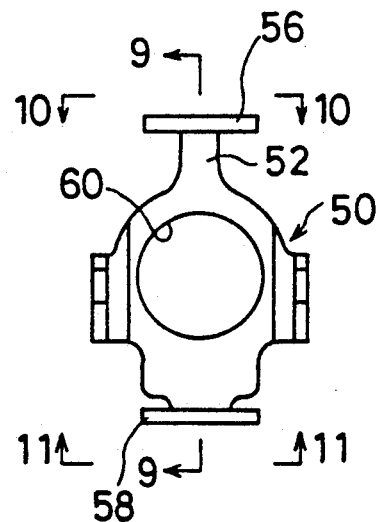
FIG. 8 is a front elevation showing a lock plate.
Figure 9:
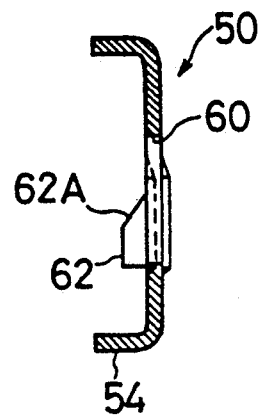
FIG. 9 is a section taken along line 9—9 of FIG. 8.
Figure 10:
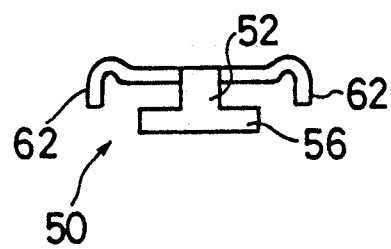
FIG. 10 is a section taken along line 10—10 of FIG. 8.
Figure 11:
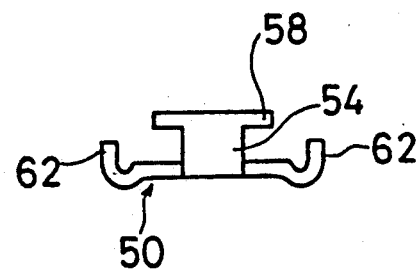
FIG. 11 is a section taken along line 11—11 of FIG. 8.

The slider 32 is equipped with: a plate portion 34 facing the front face (i.e., the face at the side of the inside of the vehicular compartment) of the guide rail 10; holding portions 36 formed by folding back the two sides of the plate portion 34 to extend around the sides of the guide rail 10 thereby to hold the same; a cylindrical portion (as better seen from FIGS. 6 and 7) 38 formed in the central portion of the plate portion 34 and extended to the back; a female thread 40 formed in the inner circumference of the cylindrical portion 38; a notched recess 42 formed in the lower side of the plate portion 34; and a pair of support portions 44 and 46 formed at the upper portion of the plate portion 34.

At the back of the guide rail 10, there is arranged a lock plate 50. This lock plate 50 is formed with an L-shaped neck 52 at its upper portion and an L-shaped leg 54 at its lower portion. The L-shaped neck 52 and the L-shaped leg 54 are respectively formed with extensions 56 and 58. The lock plate 50 is formed with an aperture 60 at its central portion and a pair of hooks 62 folded up to act as retaining portions at the side portions. The hooks 62 are sized to be fitted in the holes 30 of the guide rail 10. Moreover, the hooks 62 have their upper sides sloped, as indicated at 62A, to have an angle of inclination equal to that of the inclined faces 30A of the holes 30.

A leaf spring 70 (as dotted in FIGS. 1 and 4) is disposed to cover the compartment side of the plate portion 34 of the slider 32.

This leaf spring 70 is equipped with an L-shaped neck 72 at its upper portion and a pair of legs 74 at its lower portion. The L-shaped neck 72 is formed with extensions 76 at its leading end. The leg 74 is formed into a crank shape, as viewed from its side, and is equipped with a lock plate pushing portion 74A at its lower portion. Numeral 77 designates an aperture which is formed in the center of the leaf spring 70. Numeral 78 appearing in FIG. 1 designates the top of the leaf spring 70.

Stoppers 80 and 82 are provided for assembling those lock plate 50, slider 32 and leaf spring 70. The stopper 80 is used to fix the L-shaped necks 52 and 72 of the lock plate 50 and the leaf spring 70 to the supports 44 and 46 of the slider 32. The stopper 80 is formed with: a U-shaped portion 84 to be fitted in the spacy between the supports 44 and 46; hooks 86 protruded from the sides of the leading end of the U-shaped portion 84; and extensions 88 formed at the root of the U-shaped portion 84. The supports 44 and 46 have their opposed faces formed with recesses 90 to be engaged by the stopper 80.

Figure 12:
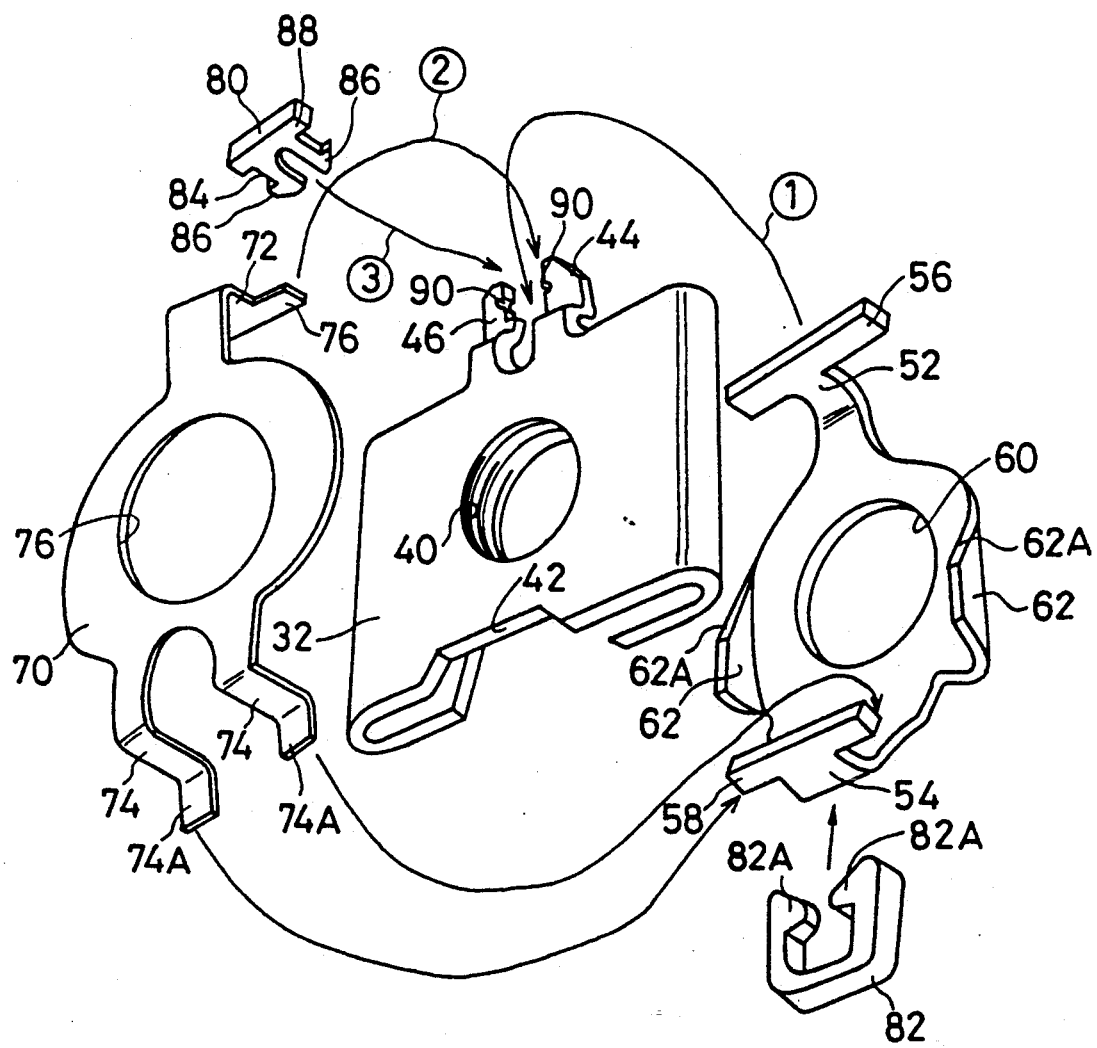
FIG. 12 is a perspective view showing an assembly of the lock plate and a leaf spring.

In order to assemble the slider 32, the lock plate 50 and the leaf spring 70 into an integral structure, as viewed above the slider 32 at arrows ①, ② and ③ in FIG. 12, the L-shaped neck 52 of the lock plate 50 is brought into engagement with the supports 44 and 46 of the slider 32. At this time, the extensions 56 are made to come out at the front face of the slider 32.

Figure 13:
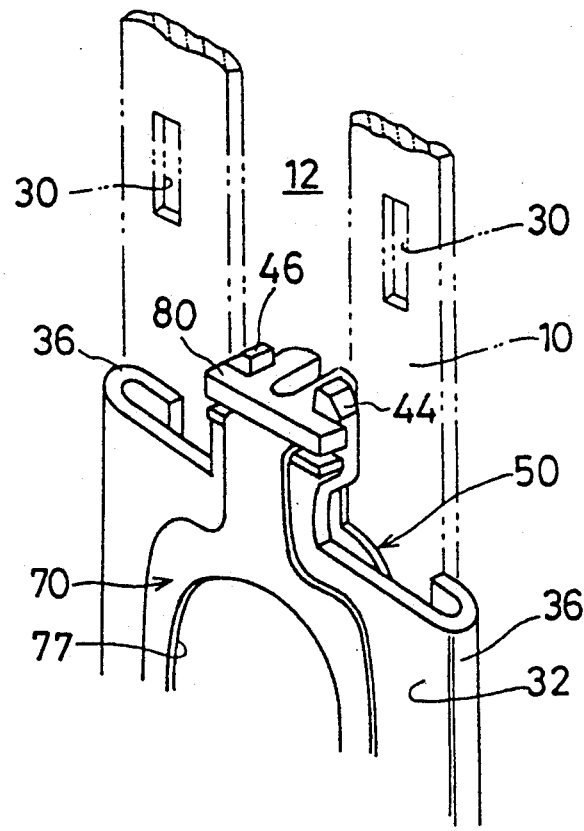
FIG. 13 is a perspective view showing an essential portion of a slider assembly.
Figure 14:
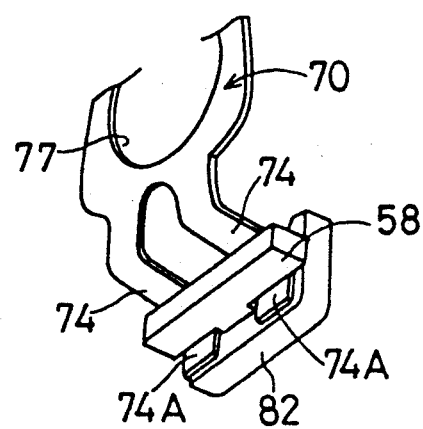
FIG. 14 is a perspective view showing a lower portion of the slider assembly.

Next, the L-shaped neck 72 of the leaf spring 70 is brought into engagement with the supports 44 and 46 such that the extensions 76 are arranged at the back of the slider 32. After this, as shown in FIG. 13, the U-shaped portion 84 of the stopper 80 is inserted from the front of the slider 32 into the gap between the supports 44 and 46, and the hooks 86 are retained at the backs of the supports 44 and 46 so that the extensions 88 of the stopper 80 are retained on the front sides of the supports 44 and 46.

Below the slider 32, the legs 74 of the leaf spring 70 are inserted around the recess 42 of the slider 32 to the back of the same slider 32. Moreover, the lock plate pushing portions 74A are arranged at the backs of the extensions 58 of the L-shaped legs 54. The stopper 82 is generally shaped into a letter "U" so that hooks 82A formed at the leading end and toward each other are retained by the side edges of the L-shaped legs 54.

Incidentally, prior to the assembly of the lock plate 50 and the leaf spring 70 with the slider 32, this slider 32 is fitted on the guide rail 10 and the bracket 18 is attached to the upper portion of the guide 10.

The belt anchor 94 is fixed on the slider 32 by screwing a (not-shown) bolt for attaching the belt anchor 94 into the female screw 40 of the cylindrical portion 38 of the slider 32. The belt anchor 94 is equipped with a control portion 96 which is depressed to push the top 78 of the leaf spring 70 toward the slider 32 so that the lock plate pushing portion 74A pushes the lower portion of the lock plate 50 through the stopper 82. Then, hooks 62 leave the holes 30 so that the lock plate 50 can move downward. In this state, the belt anchor 94 can be pulled downward. If the control portion 96 is released from the passenger's hand, the lock plate pushing portion 74A is caused to urge the lock plate 50 to the front of the guide rail 10 through the extensions 58 by the restoring force of the leaf spring 70 until the hooks 62 are fitted in the holes 30.

In this fitted state, the hooks 62 have their lower end faces engaging with those (i.e., normal faces 30B) of the holes 30 so that the lock plate 50 and the slider 32 integrated with the former are blocked against their lower movements. Then, the vehicular passenger can be restricted through the seat belt 99 which is inserted into the belt anchor 94 (as shown in FIG. 4). Incidentally, in case the belt anchor 94 is pushed upward, the slopes 62A of the hooks 62 slide on the slopes 30A of the holes 30, and the lower side of the lock plate 50 is moved apart from the guide rail 10 so that the lock plate 50 can move along the guide rail 10. Specifically, in case the belt anchor 94 is to be pulled upward, it can be moved up merely by pushing the belt anchor 94 without controlling the control portion 96. Incidentally, numeral 99 appearing in FIG. 4 designates a seat belt which is anchored at the belt anchor 94.

Thus in the present embodiment, as clearly seen from FIG. 1, the cylindrical portion 38 formed in the slider 32 is fitted in the slot 12 of the guide rail 10. As a result, the belt anchor 94 occupies a position remarkably close to the plate portion 34 of the slider 32 so that the belt anchor 94 has a remarkably small rise from the guide rail 10. As a result, the total thickness of the shoulder adjuster according to the present embodiment can be drastically reduced to widen the vehicular compartment space accordingly.

In the embodiment thus far described, moreover, the slider 32 holds the sides of the guide rail 10 at its holding portions 36 so that it can slide up and down remarkably smoothly.

In the foregoing embodiment, moreover, the lock plate 50 is retracted, if the control portion 96 is operated, to release the hooks 62 completely from the holes 30 so that the slider 32 can move remarkably lightly along the guide rail 10.

As has been described hereinbefore, according to the shoulder adjuster of the present invention, the cylindrical portion of the slider arranged in the compartment side of the guide rail is so retracted from the compartment as is fitted in the slot of the guide rail. Since, moreover, the belt anchor is attached to the slot, the protrusion of the belt anchor into the compartment can be remarkably reduced to widen the compartment space accordingly.

In addition, the shoulder adjuster can have its slider moved up and down drastically smoothly. According to the shoulder adjuster of the present invention, furthermore, the belt anchor can be moved up and down remarkably lightly by the remarkably simple operation.

I claim:

1. A vehicle shoulder adjuster comprising:
   a guide rail shaped into a long plate and having a longitudinally extending slot at its central portion and a plurality of holes at both sides of the slot;
   a slider arranged along a vehicular compartment side of said guide rail and made slidable in a longitudinal direction of said guide rail, said slider having:
   a plate portion facing a front face of said guide rail at said vehicular compartment side,
   a cylindrical portion extending rearwardly from the plate portion to be fitted in said slot,
   a female thread formed in an inner circumference of said cylindrical portion of said slider for mounting a shoulder anchor, and
   holding portions formed at opposite sides of said plate portion extending around opposite sides of said guide rail permitting sliding motion along said sides; and
   retaining means for retaining said slider on said guide rail at a predetermined interval, said retaining means including:
   a lock plate arranged at a back side of said guide rail opposite to said vehicular compartment side and supported by said slider at one longitudinal side of said lock plate such that its longitudinal other side is made movable toward and apart from said slider;
   hooks formed at said lock plate and adapted to engage said holes to block sliding movement of said slider when said other side of said lock plate is brought to said slider; and
   a leaf spring supported by said slider and connected to said longitudinal other side of said lock plate for urging said longitudinal other side toward said slider so that when the leaf spring is pushed toward the guide rail, the lock plate inclines backward to disengage the hooks from the holes of the guide rail to allow the slider to smoothly slide along the guide rail without tilting against the guide rail.

2. A shoulder adjuster according to claim 1, wherein said plate portion has a notched recess formed on a lower side thereof and a pair of support portions at an upper portion thereof,
   said lock plate has an L-shaped neck extending upwardly from an upper portion thereof and having a pair of lateral extensions and an L-shaped leg extending downwardly from a lower portion thereof and having a pair of lateral extensions, and
   said leaf spring has an L-shaped neck extending upwardly from an upper portion thereof and a pair of legs extending downwardly from a lower portion thereof.

3. A shoulder adjuster according to claim 2, further comprising:
   a substantially U-shaped upper stopper fitted in a space between said support portions of said slider to secure said L-shaped necks of said lock plate and said leaf spring respectively; and
   a substantially C-shaped lower stopper fitted over said L-shaped leg of said lock plate to secure said legs of said leaf spring to said lock plate through said recess of said slider such that when said leaf spring is depressed, said lower portion of said lock plate is retreated backwardly from said guide rail thereby releasing engagement between said hooks of said lock plate and said holes of said guide rail.

4. A shoulder adjuster according to claim 1, wherein said one longitudinal side of said lock plate is positioned at an upper side of said guide rail whereas said other side is positioned at a lower side of said guide rail.

5. A shoulder adjuster according to claim 4, wherein said holes formed in said guide rail are arranged at a constant distance from each other in the longitudinal direction.

6. A shoulder adjuster according to claim 5, wherein said hooks have upper faces sloped down toward their leading ends whereas said holes have upper inner faces sloped to match the slopes of said hooks so that said hooks are naturally released to come out of said holes by said sloped faces, if said slider is pushed up, to allow said slider to move upward.

7. A shoulder adjuster according to claim 6, wherein lower faces of said hooks and lower edges of inner faces of said openings are normal to the face of said guide rail so that said slider is fixedly stopped if said hooks come into engagement with the lower edges of said openings.

* * * * *